(12) United States Patent
Hopkins et al.

(10) Patent No.: US 12,500,122 B2
(45) Date of Patent: Dec. 16, 2025

(54) INTERDECK LAYERS AND PILLAR ALIGNMENT

(71) Applicant: Intel NDTM US LLC, Santa Clara, CA (US)

(72) Inventors: John Hopkins, Milpitas, CA (US); Anil Chandolu, Boise, ID (US); Nancy Lomeli, Boise, ID (US)

(73) Assignee: Intel NDTM US LLC, Santa Clara, CA (US)

( * ) Notice: Subject to any disclaimer, the term of this patent is extended or adjusted under 35 U.S.C. 154(b) by 359 days.

(21) Appl. No.: 18/087,688

(22) Filed: Dec. 22, 2022

(65) Prior Publication Data
US 2023/0130525 A1  Apr. 27, 2023

(51) Int. Cl.
| | |
|---|---|
| *H01L 21/768* | (2006.01) |
| *H01L 23/535* | (2006.01) |
| *H10B 41/20* | (2023.01) |
| *H10B 41/30* | (2023.01) |
| *H10B 41/35* | (2023.01) |
| *H10B 43/20* | (2023.01) |
| *H10B 43/30* | (2023.01) |
| *H10B 43/35* | (2023.01) |

(52) U.S. Cl.
CPC .. *H01L 21/76897* (2013.01); *H01L 21/76805* (2013.01); *H01L 21/76895* (2013.01); *H01L 23/535* (2013.01); *H10B 41/20* (2023.02); *H10B 41/30* (2023.02); *H10B 41/35* (2023.02); *H10B 43/20* (2023.02); *H10B 43/30* (2023.02); *H10B 43/35* (2023.02)

(58) Field of Classification Search
CPC ...... H10B 63/84; H10B 63/845; H10B 41/20; H10B 41/30; H10B 41/35; H10B 41/41; H10B 43/20; H10B 43/30; H10B 43/35; G11C 2213/71; G11C 2213/75; G11C 2216/16; G11C 2216/18; G11C 5/06; G11C 11/4063; H01L 23/5226; H01L 23/53295; H01L 23/5329; H01L 23/535; H01L 21/4814; H01L 21/76897; H01L 21/76805; H01L 21/76895; H01L 21/76804; H10D 88/00; H10D 88/101; G06F 3/0679; G06N 3/065; G06N 3/08; G06N 3/049; G06N 3/063; G06N 3/047; G06N 3/09; G06N 20/00; G06N 3/045; G06N 3/061; G06N 3/084; G06N 5/022
See application file for complete search history.

(56) References Cited

U.S. PATENT DOCUMENTS

2021/0249261 A1*  8/2021  Hopkins ................ H10B 43/35

\* cited by examiner

*Primary Examiner* — Thanhha S Pham
(74) *Attorney, Agent, or Firm* — Morgan, Lewis & Bockius LLP

(57) ABSTRACT

A semiconductor circuit includes multiple decks of semiconductor devices, each deck having multiple three-dimensional (3D) stacks. The semiconductor circuit has a nitride layer between the first deck and the second deck. The nitride layer has a self-aligned pillar through the nitride layer to electrically connect the first deck to the second deck. The nitride layer can have multiple sublayers, with a mirrored gradient doping, with lower doping toward the middle of the nitride layer and higher doping toward the outsides of the nitride layer that interfaces with the decks.

19 Claims, 13 Drawing Sheets

INTERDECK LAYERS AND PILLAR ALIGNMENT

TECHNICAL FIELD

Descriptions are generally related to semiconductor circuits, and more particular descriptions are related to multideck semiconductor circuits.

BACKGROUND OF THE INVENTION

There is a continual demand for computer devices that are smaller and use less power. One approach to address these demands is to increase semiconductor circuit density. Three-dimensional (3D) circuit structures can have multiple layers stacked vertically on a base semiconductor substrate. There are limitations to the aspect ratio of vertical structures in semiconductor materials based on physics and chemistry. The aspect ratio can limit the density and the number of layers in a vertical stack, seeing that the pitch between pillars is dependent on how vertical the sidewalls of the vertical pillars can be made.

Multideck stacks allow forming vertical structures in tiers, with the different tiers/decks connected between a deck separation structure. The deck separation structure can be referred to as an interdeck layer or interdeck structure. Interdeck layers typically provide electrical isolation between the decks. The semiconductor processing punches an opening through the interdeck layer to be able to connect one deck to the next. Despite processing to control the properties of the interdeck layer, the processing can cause punch damage, pillar tilt, and misalignment of the interdeck connections.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION OF THE INVENTION

As described herein, a semiconductor circuit includes multiple decks of semiconductor devices, each deck having multiple three-dimensional (3D) stacks. The 3D stacks can include semiconductor circuits such as storage circuits. The semiconductor circuit has a nitride layer between the first deck and the second deck. The nitride layer has a self-aligned pillar through the nitride layer to electrically connect the first deck to the second deck. The self-aligned pillar can have a portion with sloped sides to have a wider opening to allow alignment between the first deck and the second deck.

The nitride layer can have multiple sublayers, to enable forming the pillar portion with the sloped sidewalls (e.g., a trapezoidal cross-section), with a "straight" pillar portion above the sloped pillar portion. The sloped sidewall portion can be referred to as a "funnel" portion. In one example, the nitride sublayers can have a mirrored gradient doping, with lower doping toward the middle of the nitride layer and higher doping toward the outsides of the nitride layer that interfaces with the decks.

The pillar through the nitride interdeck layer can improve line of sight specifications and minimize punch damage. The use of the nitride can allow selective etching of the interdeck layer, which can improve punch capability by improving punch line of sight and funnel formation. The use of the funnel opening can increase the second pillar bottom critical dimension (CD).

Figure 1A:
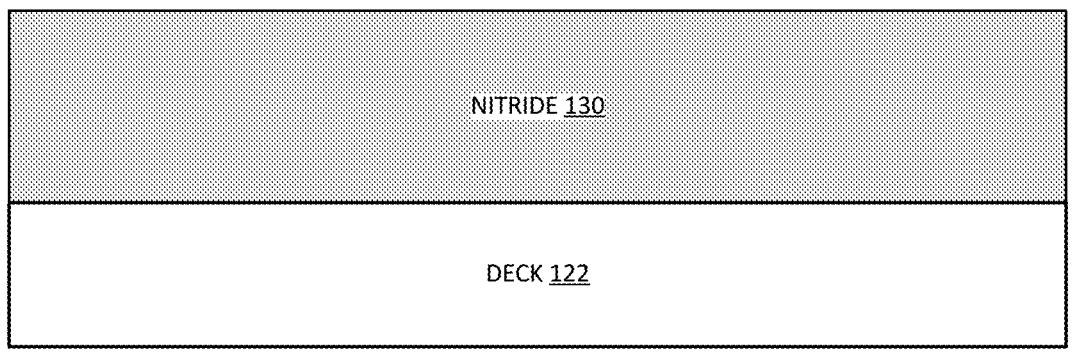
FIGS. 1A-1E are block diagrams of an example of creation of a nitride interdeck layer.

FIGS. 1A-1E are block diagrams of an example of creation of a nitride interdeck layer. FIG. 1A illustrates view 102, which represents a cross section of a stage in semiconductor processing. In view 102, the processing generates deck 122, which represents a deck of multiple layers of semiconductor devices in a vertical stack. The processing deposits nitride 130 on deck 122, which can be referred to as a nitride cap.

It will be understood that the elements illustrated in view 102 are not necessarily to scale. View 102 represents a portion of a 3D stack. It will be understood that view 102 illustrates portions of a circuit, and deck 122 can be disposed directly on the semiconductor substrate. Alternatively, there can be one or more decks between deck 122 and the semiconductor substrate. In one example, deck 122 includes an oxide layer, and nitride 130 is created on the oxide layer.

In one example, the semiconductor devices are memory devices. The memory devices can be volatile memory cells or nonvolatile memory cells. Volatile memory cells have indeterminate state when power is interrupted to the devices. An example of volatile memory is dynamic random access memory (DRAM). Nonvolatile memory cells have determinate state even when power is interrupted to the devices. An example of nonvolatile memory is 3D NAND (inverted AND).

Figure 1B:
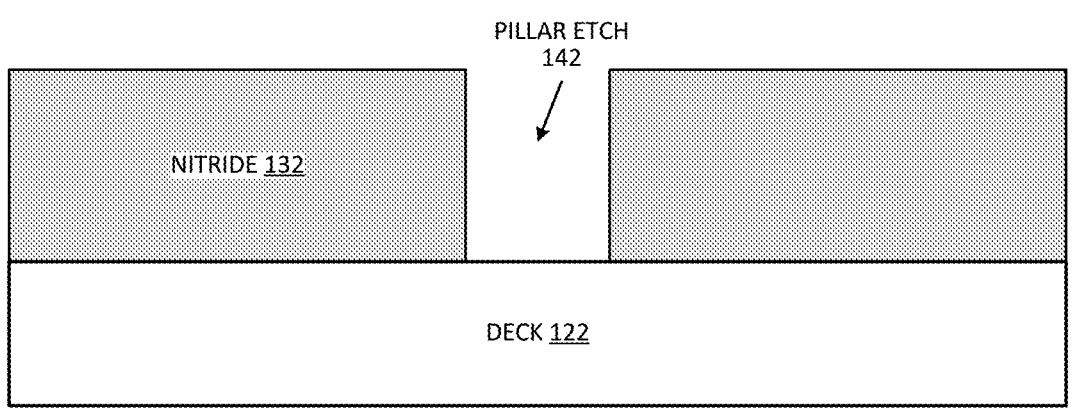

FIG. 1B illustrates view 104, which represents a cross section of the circuit of view 102 with a pillar etch. Pillar etch 142 represents an opening formed in the nitride layer. Nitride 132 represents the nitride layer as modified with the pillar etch. Pillar etch 142 can be a dry etch having substantially vertical sidewalls. The dry etch can be selective to the nitride, which would cause minimal to no etching of the material of deck 122.

Figure 1C:
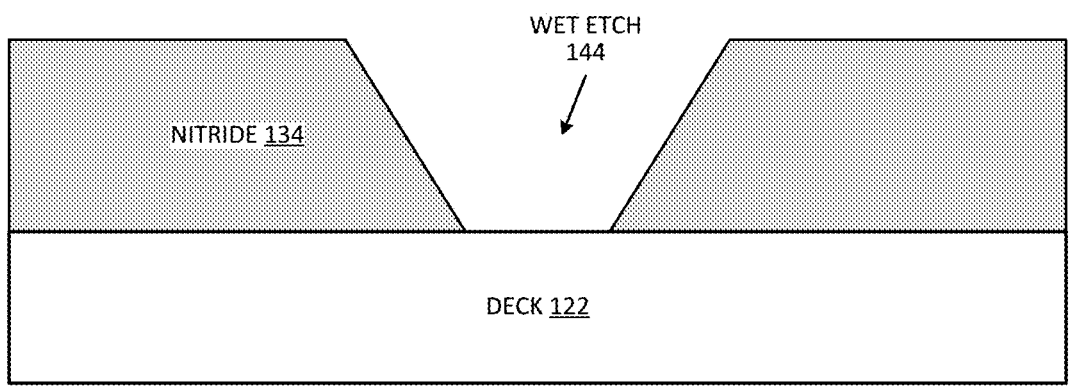

FIG. 1C illustrates view 106, which represents a cross section of the circuit of view 106 with a wet etch to open the opening. Wet etch 144 represents an opening formed in the nitride layer. Nitride 134 represents the nitride layer as modified with the wet etch. Wet etch 144 can represent an opening formed by the use of a chemical solution that is selective to the nitride. The application of the wet etch can create the funnel shaped opening.

Figure 1D:
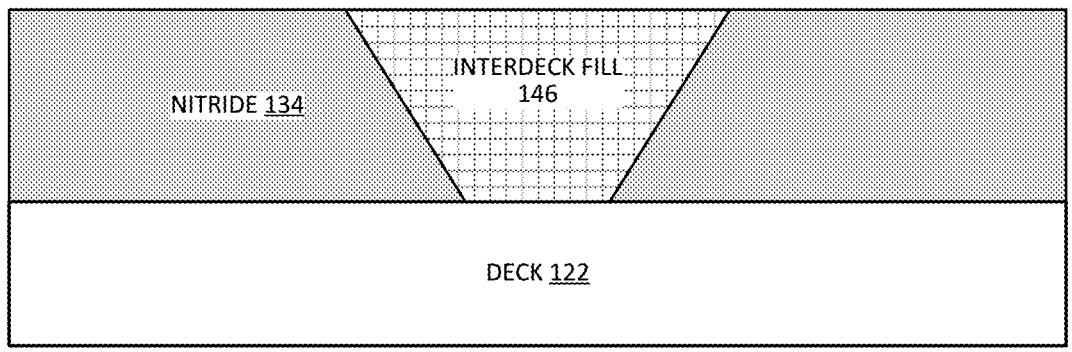

FIG. 1D illustrates view 108, which represents a cross section of the circuit of view 106 after filling the etched opening. Interdeck fill 146 represents a material deposited as a sacrificial layer. Nitride 134 represents the nitride layer. Interdeck fill 146 can be any material that can be selectively removed relative to nitride 134 and deck 122. In one example, interdeck fill 146 can be a specific oxide material. In one example, interdeck fill 146 can be a metal or a semiconductor material.

Figure 1E:
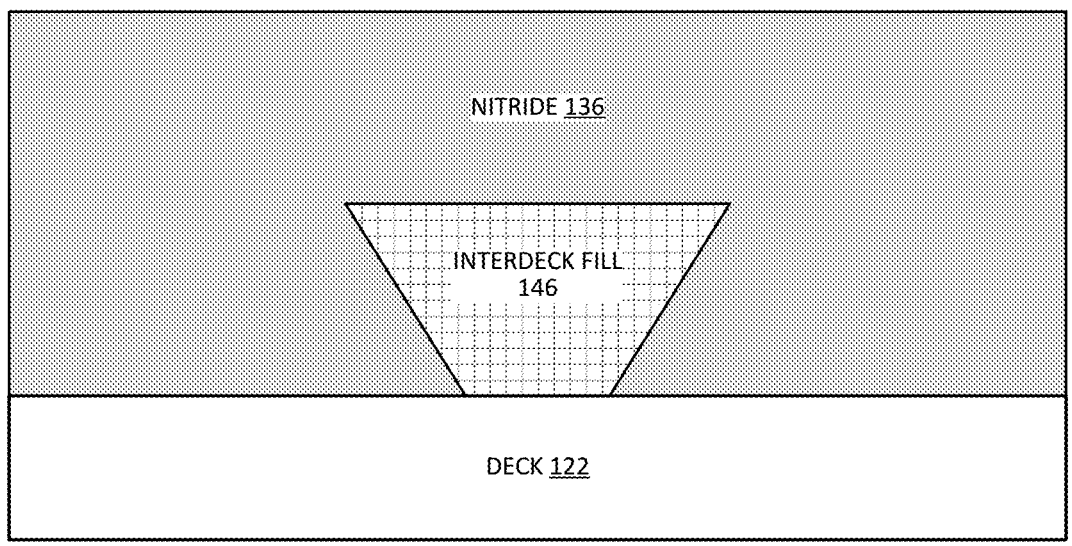

FIG. 1E illustrates view 110, which represents a cross section of the circuit of view 108 after depositing a second sublayer of nitride. Nitride 136 represents the nitride layer after buildup of the nitride on top of the nitride layer and interdeck fill 146. Nitride 136 represents an interdeck dielectric layer on deck 122, which will eventually be positioned between two tier stacks. Nitride 136 includes a funnel shaped fill material above an area of deck 122 where there will be an interconnection between deck 122 and a deck above nitride 136.

FIGS. 2A-2E are block diagrams of an example of creation of a nitride interdeck layer with gradient doping in the nitride. These diagrams can be an example of an extension of FIGS. 1A-1E, or can be an alternative to FIGS. 1A-1E.

Figure 2A:
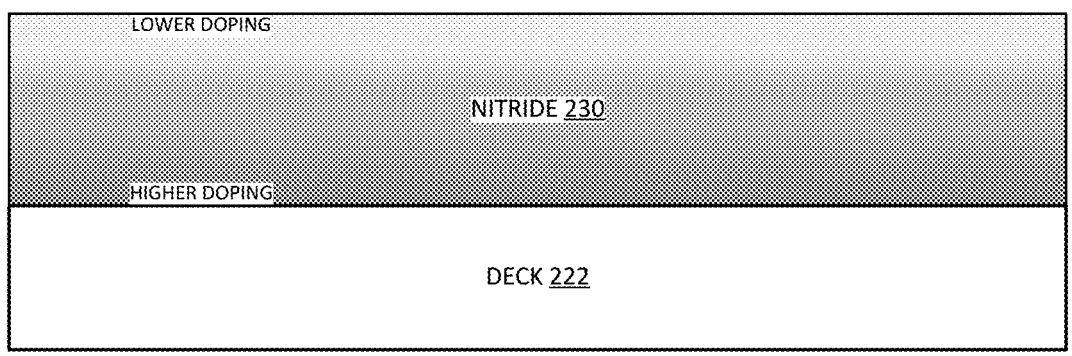
FIGS. 2A-2E are block diagrams of an example of creation of a nitride interdeck layer with gradient doping in the nitride.

FIG. 2A illustrates view 202, which represents a cross section of a stage in semiconductor processing. In view 202, the processing generates deck 222, which represents a deck of multiple layers of semiconductor devices in a vertical stack. The processing deposits nitride 230 on deck 222, which can be referred to as a nitride cap.

Nitride 230 has a gradient doping, with darker shading representing higher doping (a higher concentration of dopants) and lighter shading representing lower doping (a lower concentration of dopants). In one example, the doping of the nitride layer includes carbon dopants. Alternatively, the nitride layer can be doped with boron, sulfur, titanium, tantalum, or a transition metal such as vanadium. The nitride dopant can preferentially produce a nitride that supports selective etching.

It will be understood that the elements illustrated in view 202 are not necessarily to scale. View 202 represents a portion of a 3D stack. It will be understood that view 202 illustrates portions of a circuit, and deck 222 can be disposed directly on the semiconductor substrate. Alternatively, there can be one or more decks between deck 222 and the semiconductor substrate. In one example, deck 222 includes an oxide layer, and nitride 230 is created on the oxide layer.

In one example, the semiconductor devices are memory devices. The memory devices can be volatile memory cells or nonvolatile memory cells. Volatile memory cells have indeterminate state when power is interrupted to the devices. An example of volatile memory is dynamic random access memory (DRAM). Nonvolatile memory cells have determinate state even when power is interrupted to the devices. An example of nonvolatile memory is 3D NAND (inverted AND).

Figure 2B:
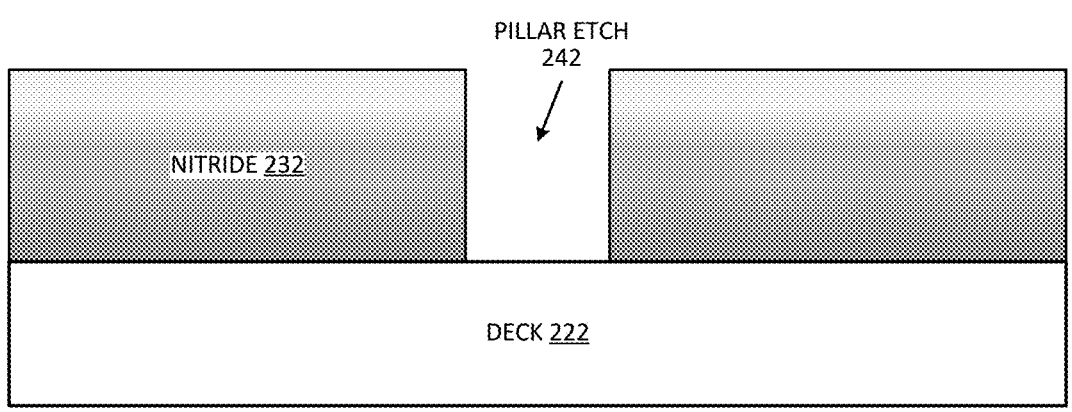

FIG. 2B illustrates view 204, which represents a cross section of the circuit of view 202 with a pillar etch. Pillar etch 242 represents an opening formed in the nitride layer. Nitride 232 represents the nitride layer as modified with the pillar etch. Pillar etch 242 can be a dry etch having substantially vertical sidewalls. The dry etch can be selective to the nitride, which would cause minimal to no etching of the material of deck 222.

Figure 2C:
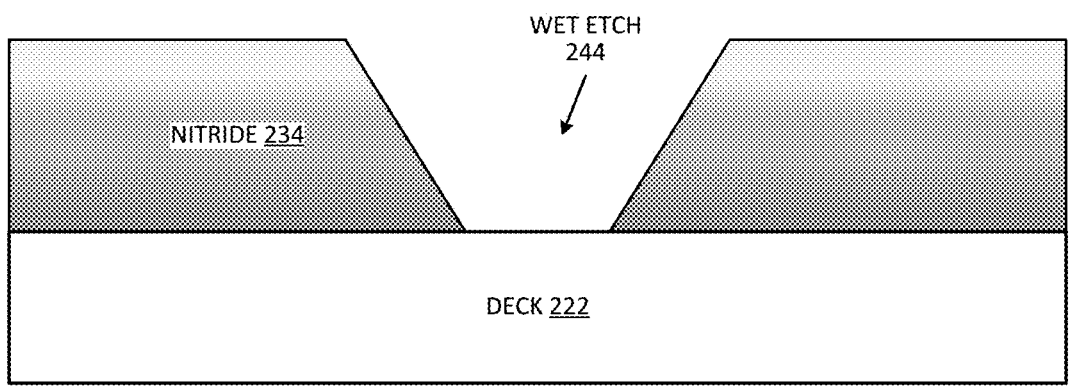

FIG. 2C illustrates view 206, which represents a cross section of the circuit of view 206 with a wet etch to open the opening. Wet etch 244 represents an opening formed in the nitride layer. Nitride 234 represents the nitride layer as modified with the wet etch. Wet etch 244 can represent an opening formed by the use of a chemical solution that is selective to the nitride. The application of the wet etch can create the funnel shaped opening.

In one example, the funnel shape is achieved by wet etch of the carbon doping gradient of the nitride, allowing etching to create a sloped sidewall due to etching the lower-doped region more than the higher-doped region. More specifically, wet etch 244 can have selective etching that is selective to the carbon dopant or other dopant material used to dope nitride 234.

Figure 2D:
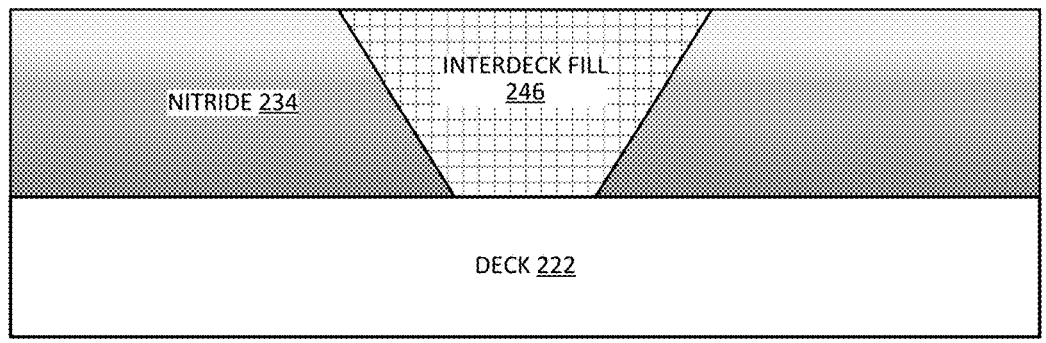

FIG. 2D illustrates view 208, which represents a cross section of the circuit of view 206 after filling the etched opening. Interdeck fill 246 represents a material deposited as a sacrificial layer. Nitride 234 represents the nitride layer. Interdeck fill 246 can be any material that can be selectively removed relative to nitride 234 and deck 222. In one example, interdeck fill 246 can be a specific oxide material. In one example, interdeck fill 246 can be a metal or a semiconductor material. Interdeck fill 246 can be a funnel with the smaller part of the funnel at the interface to deck 222 at the higher doping concentration. The larger part of the funnel can be at the portion of nitride 234 with the lower doping concentration.

Figure 2E:
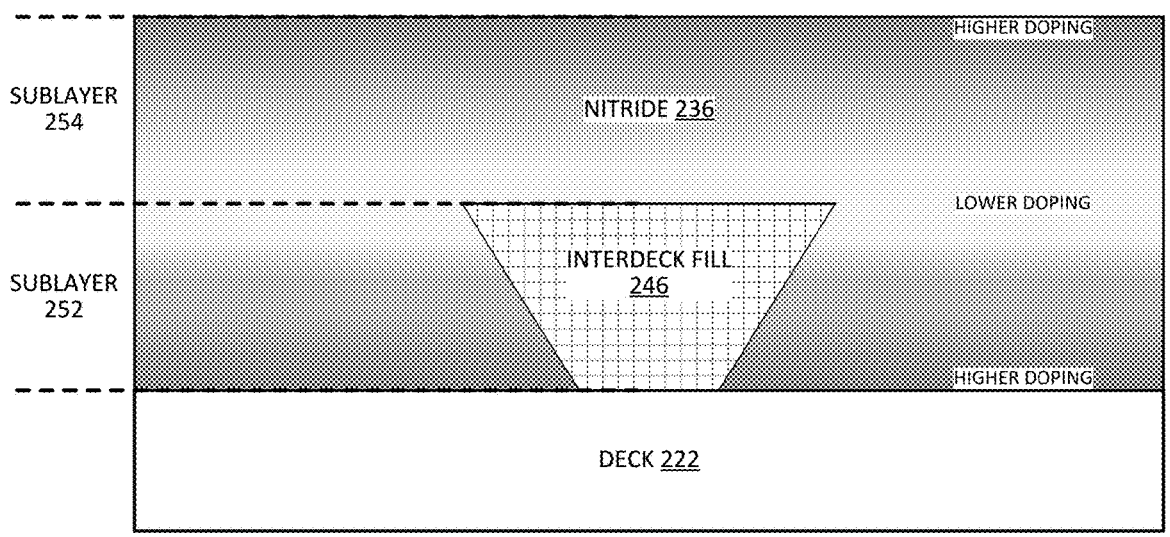

FIG. 2E illustrates view 210, which represents a cross section of the circuit of view 208 after depositing a second sublayer of nitride. Nitride 236 represents the nitride layer after buildup of the nitride on top of the nitride layer and interdeck fill 246. Nitride 236 represents an interdeck dielectric layer on deck 222, which will eventually be positioned between two tier stacks. Nitride 236 includes a funnel shaped fill material above an area of deck 222 where there will be an interconnection between deck 222 and a deck above nitride 236.

In one example, nitride 236 is created by depositing two sublayers of nitride material, one processed with the funnel shape and one deposited on the other once the funnel is formed. Sublayer 252 represents the first sublayer, with interdeck fill 246 as the funnel shape formed in it. Sublayer 254 represents the second sublayer, which can have a mirror image doping gradient relative to sublayer 254. More specifically, sublayer 252 has higher doping at the interface with deck 222 and lower doping at the interface with sublayer 254. Sublayer 254 has higher doping at the top, where it will interface with a subsequent deck, and lower doping at the interface with sublayer 252. In one example, sublayer 252 has gradient doping and sublayer 254 is not doped.

FIGS. 3A-3D are block diagrams of an example of creation of a centered pillar in a nitride interdeck layer. These diagrams can illustrate processing that occurs after view 110 of FIG. 1E or after view 210 of FIG. 2E. Thus, after the processing that results in view 110, the processing starting in view 302 can be performed. Alternatively, after the processing that results in view 210, the processing starting in view 302 can be performed.

Figure 3A:
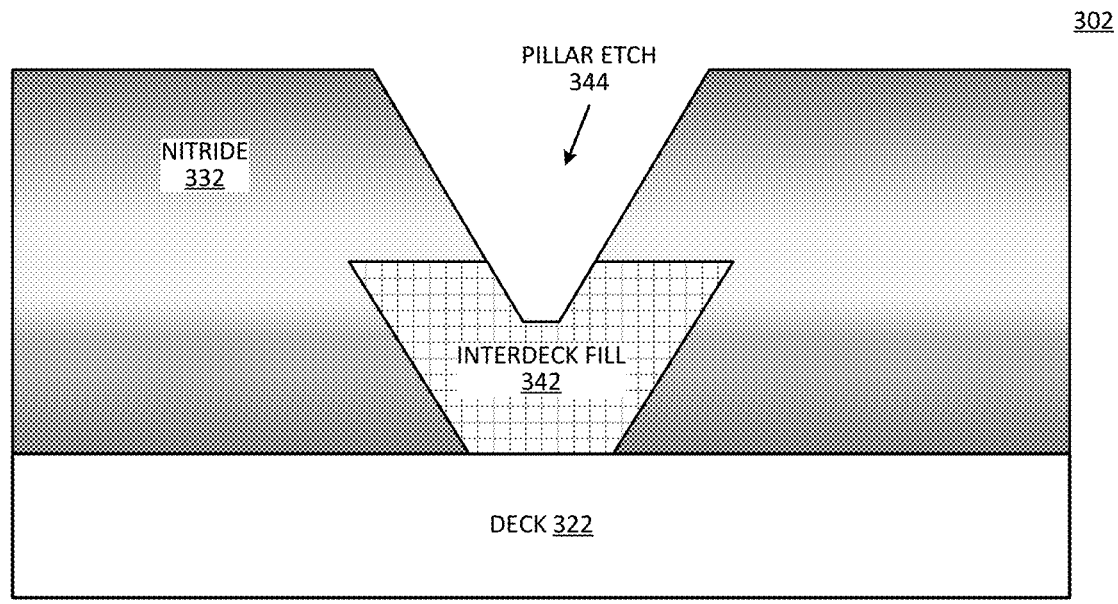
FIGS. 3A-3D are block diagrams of an example of creation of a centered pillar in a nitride interdeck layer.

FIG. 3A illustrates view 302, which represents a cross section of the circuit of view 110 or the circuit of view 210 after applying a pillar etch to form a funnel at the upper portion of the nitride layer. More specifically, the funnel can be formed in the upper sublayer of the nitride layer, above the interdeck fill funnel.

Nitride 332 represents the nitride layer, which can include multiple sublayers. The multiple sublayers include at least a first sublayer and a second sublayer. Nitride 332 includes a funnel opening after application of pillar etch 344. Interdeck fill 342 represents a funnel shaped fill in the bottom portion of the nitride layer, such as in a first sublayer. In one example, pillar etch 344 etches into interdeck fill 342, as illustrated in view 302. Deck 322 represents the deck on which nitride 332 is generated.

Figure 3B:
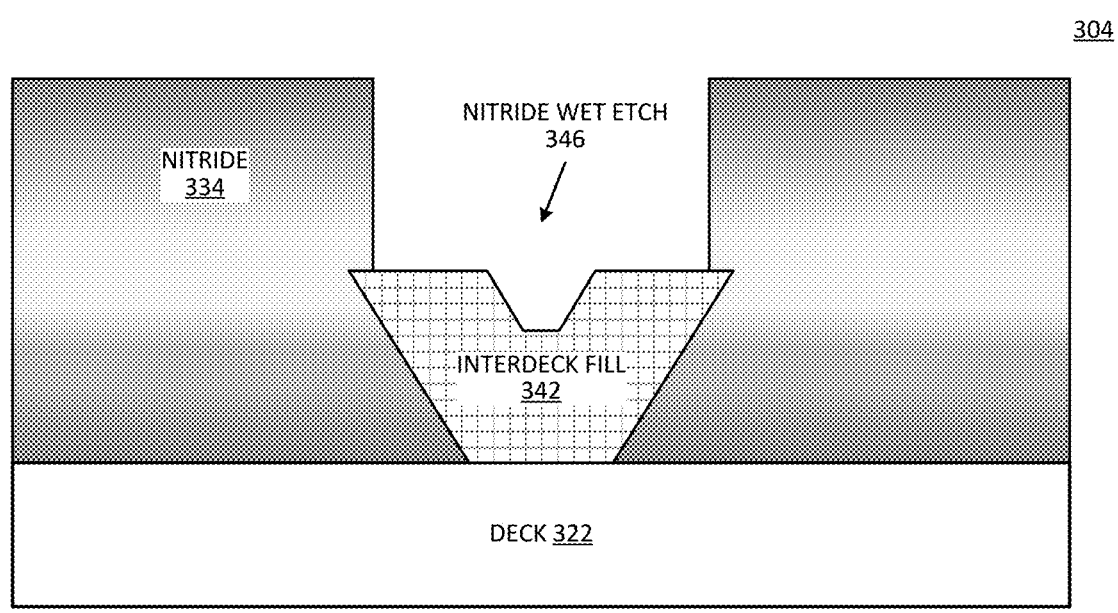

FIG. 3B illustrates view 304, which represents a cross section of the circuit of view 302 after applying a wet nitride etch to form a funnel at the upper portion of the nitride layer. Nitride wet etch 346 can open the funnel opening created in the circuit of view 302.

Nitride 334 represents the nitride layer after application of nitride wet etch 346, with sidewalls that are vertical or substantially vertical, as opposed to the intentionally sloped walls of the funnel shape. In one example, interdeck fill 342 does not change if the wet etch is selective to the nitride without affecting the fill material. In one example, nitride wet etch 346 is self-aligned to the pillars created in the circuit.

Nitride wet etch 346 can recess the second nitride sublayer to open up the bottom of the sublayer more than the top. In one example, nitride wet etch 346 can open both the bottom and top of the nitride. The funnel shape of interdeck fill 342 can open the critical dimension (CD) for the etch through the top of the nitride layer (nitride 334). Thus, the resulting opening created by nitride wet etch 346 can be wider than the bottom of interdeck fill 342, where the nitride interfaces with deck 322.

In one example, nitride wet etch 346 can recess the sidewalls of the pillar etch from sloped to substantially vertical based on the doping of the top sublayer of nitride 334. More specifically, with higher doping at the top of the nitride layer and lower doping in the middle of the nitride layer at the interface with interdeck fill 342, a nitride wet etch would etch the middle more than the top, allowing the straightening of the profile of the pillar etch. It can be observed that the opening is centered in that the straight portion is entirely over the funnel portion.

Figure 3C:
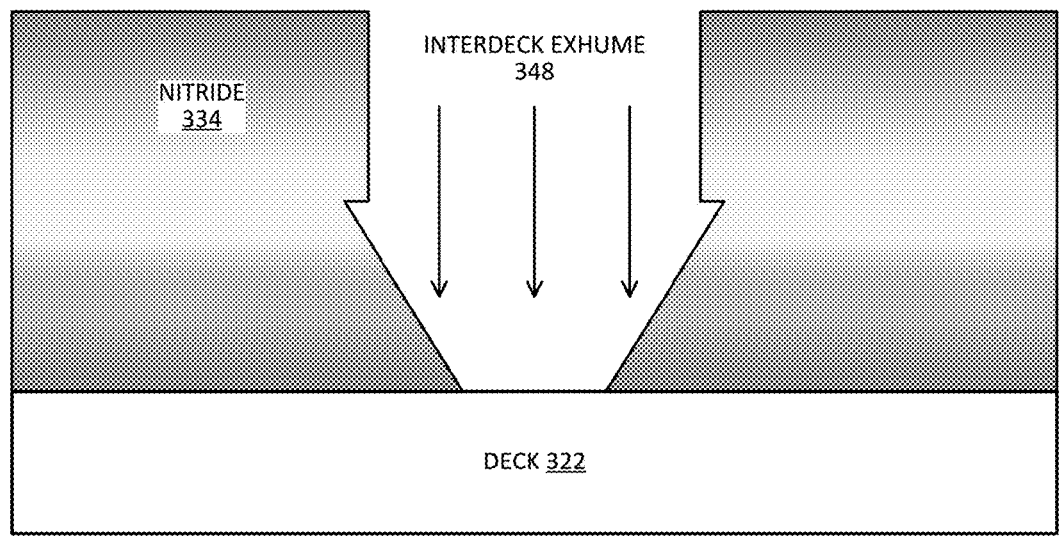

FIG. 3C illustrates view 306, which represents a cross section of the circuit of view 304 after applying an interdeck exhume. Interdeck exhume 348 represents a processing operation to remove the interdeck fill material, leaving an opening through nitride 334, from the top to the bottom of the nitride layer. Interdeck exhume 348 can expose deck 322.

Figure 3D:
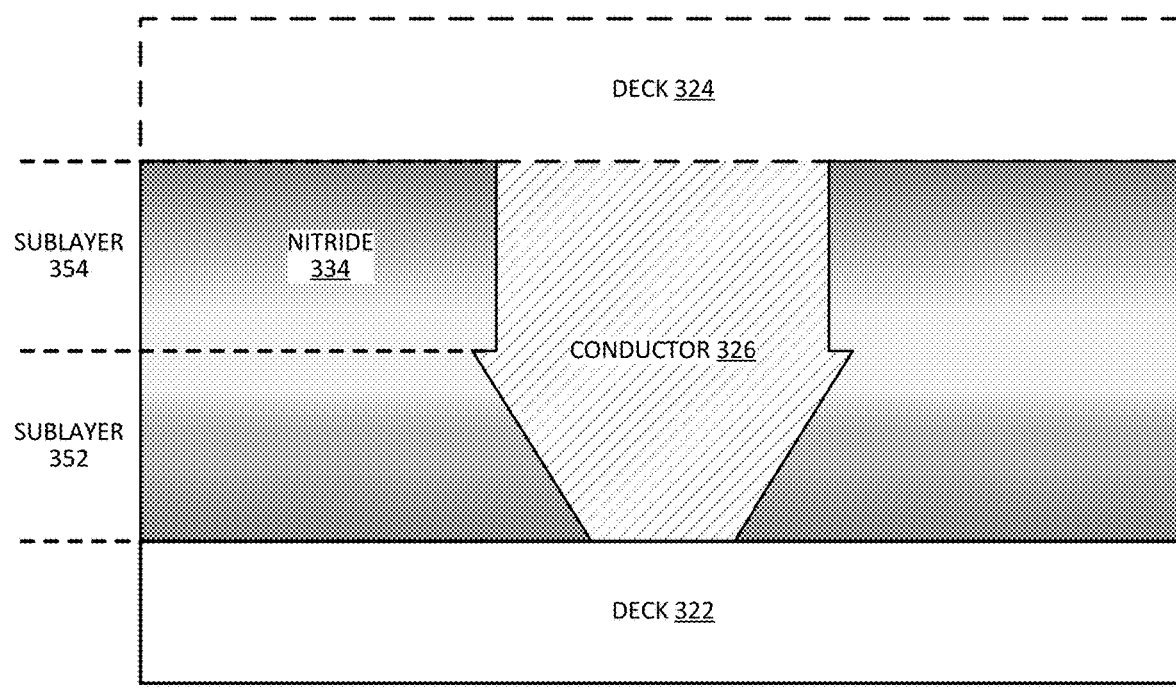

FIG. 3D illustrates view 308, which represents a cross section of the circuit of view 308 after depositing conductor 326 and creating deck 324. In one example, nitride 334 has two sublayers, referring to layers of nitride deposited with separate processing operations. Sublayer 352 represents a first sublayer deposited on deck 322. Sublayer 354 represents a second sublayer deposited on the first sublayer.

Conductor 326 represents a conductor such as metal or heavily doped polysilicon to provide an electrical connection between deck 322 and deck 324. Deck 324 represents a second deck to be created above deck 322. Nitride 334 represents an interdeck layer to separate deck 324 from deck 322. Conductor 326 represents a pillar connection to interconnect the two decks. Nitride 334 is between the two decks. Conductor 326 represents a self-aligned pillar having a portion with a sloped edge/sidewall and a portion with a vertical edge or substantially vertical edge/sidewall.

The details of deck 322 and deck 324 are not specifically illustrated. The decks have integrated circuits, such as memory/storage devices, in a 3D stack. In one example, the bottom and top of each deck has an oxide layer. Thus, deck 324 can include an oxide layer at an interface of sublayer 354 with deck 324, and deck 322 can include an oxide layer at an interface of sublayer 352 with deck 322.

FIGS. 4A-4D are block diagrams of an example of creation of a non-centered pillar in a nitride interdeck layer. These diagrams can illustrate processing that occurs after view 110 of FIG. 1E or after view 210 of FIG. 2E. Thus, after the processing that results in view 110, the processing starting in view 402 can be performed. Alternatively, after the processing that results in view 210, the processing starting in view 402 can be performed.

Figure 4A:
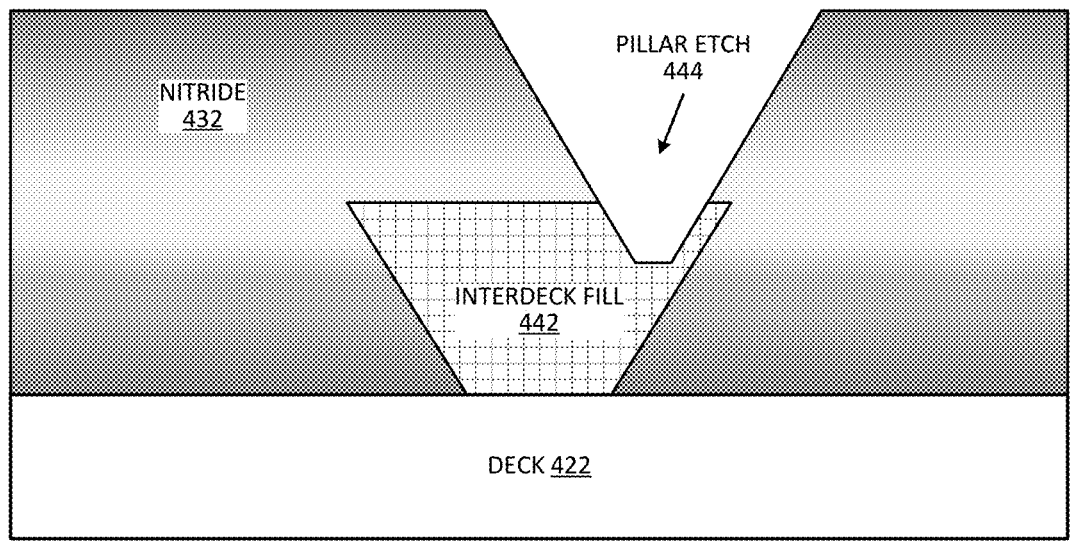
FIGS. 4A-4D are block diagrams of an example of creation of a non-centered pillar in a nitride interdeck layer.

FIG. 4A illustrates view 402, which represents a cross section of the circuit of view 110 or the circuit of view 210 after applying a pillar etch to form a funnel at the upper portion of the nitride layer. More specifically, the funnel can be formed in the upper sublayer of the nitride layer, at least partially above the interdeck fill funnel. When the funnel is not completely over the interdeck fill, the pillar can be referred to as offset. An offset pillar can result from the pillar not being completely aligned.

Nitride 432 represents the nitride layer, which can include multiple sublayers. The multiple sublayers include at least a first sublayer and a second sublayer. Nitride 432 includes a funnel opening after application of pillar etch 444. Interdeck fill 442 represents a funnel shaped fill in the bottom portion of the nitride layer, such as in a first sublayer. In one example, pillar etch 444 etches into interdeck fill 442, as illustrated in view 402. Deck 422 represents the deck on which nitride 432 is generated.

Figure 4B:
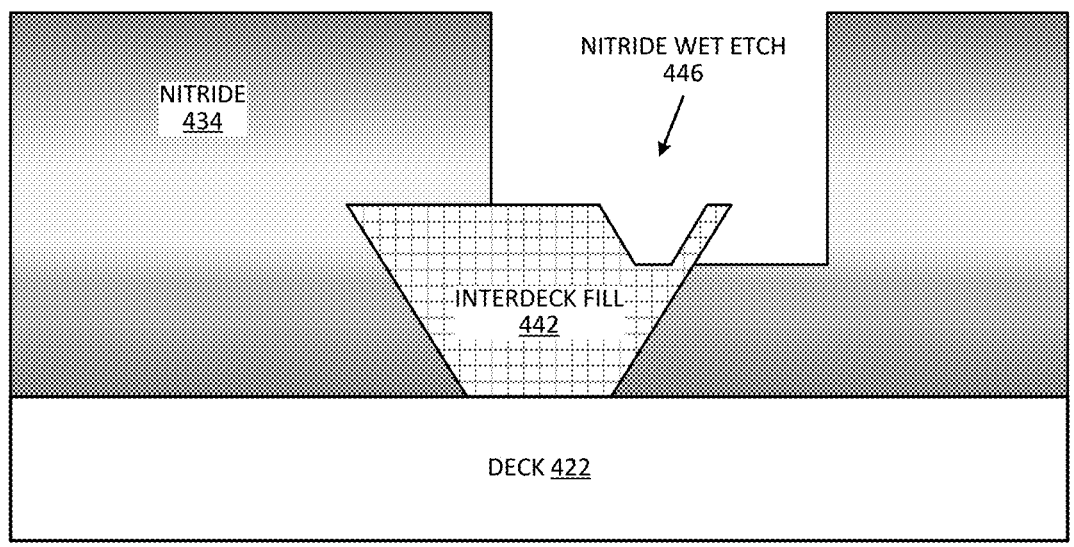

FIG. 4B illustrates view 404, which represents a cross section of the circuit of view 402 after applying a wet nitride etch to form a funnel at the upper portion of the nitride layer. Nitride wet etch 446 can open the funnel opening created in the circuit of view 402.

Nitride 334 represents the nitride layer after application of nitride wet etch 446, with sidewalls that are vertical or substantially vertical, as opposed to the intentionally sloped walls of the funnel shape. In one example, interdeck fill 442 does not change if the wet etch is selective to the nitride without affecting the fill material. In one example, the pillar etch is not completely aligned with interdeck fill 442, resulting in an opening from nitride wet etch 446 that is offset relative to interdeck fill 442.

Nitride wet etch 446 can recess the second nitride sublayer to open up the bottom of the sublayer more than the top. In one example, nitride wet etch 446 can open both the bottom and top of the nitride. The funnel shape of interdeck fill 442 can open the critical dimension (CD) for the etch through the top of the nitride layer (nitride 434). Thus, the resulting opening created by nitride wet etch 446 can be wider than the bottom of interdeck fill 442, where the nitride interfaces with deck 422.

In one example, nitride wet etch 446 can recess the sidewalls of the pillar etch from sloped to substantially vertical based on the doping of the top sublayer of nitride 434. More specifically, with higher doping at the top of the nitride layer and lower doping in the middle of the nitride layer at the interface with interdeck fill 442, a nitride wet etch would etch the middle more than the top, allowing the straightening of the profile of the pillar etch. It can be observed that the opening is centered in that the straight portion is entirely over the funnel portion.

Figure 4C:
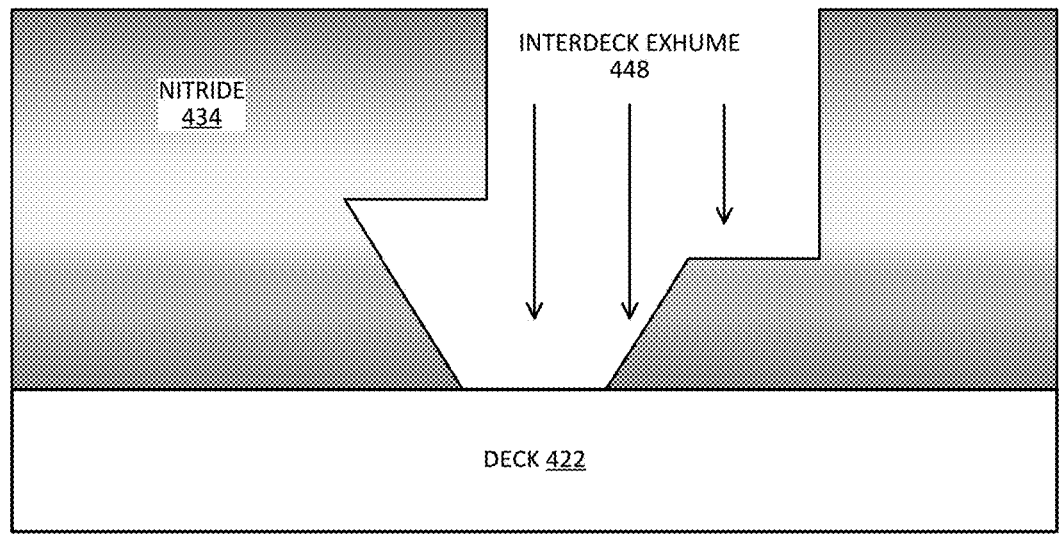

FIG. 4C illustrates view 406, which represents a cross section of the circuit of view 304 after applying an interdeck exhume. Interdeck exhume 448 represents a processing operation to remove the interdeck fill material, leaving an opening through nitride 434, from the top to the bottom of the nitride layer. Interdeck exhume 448 can expose deck 422.

Figure 4D:
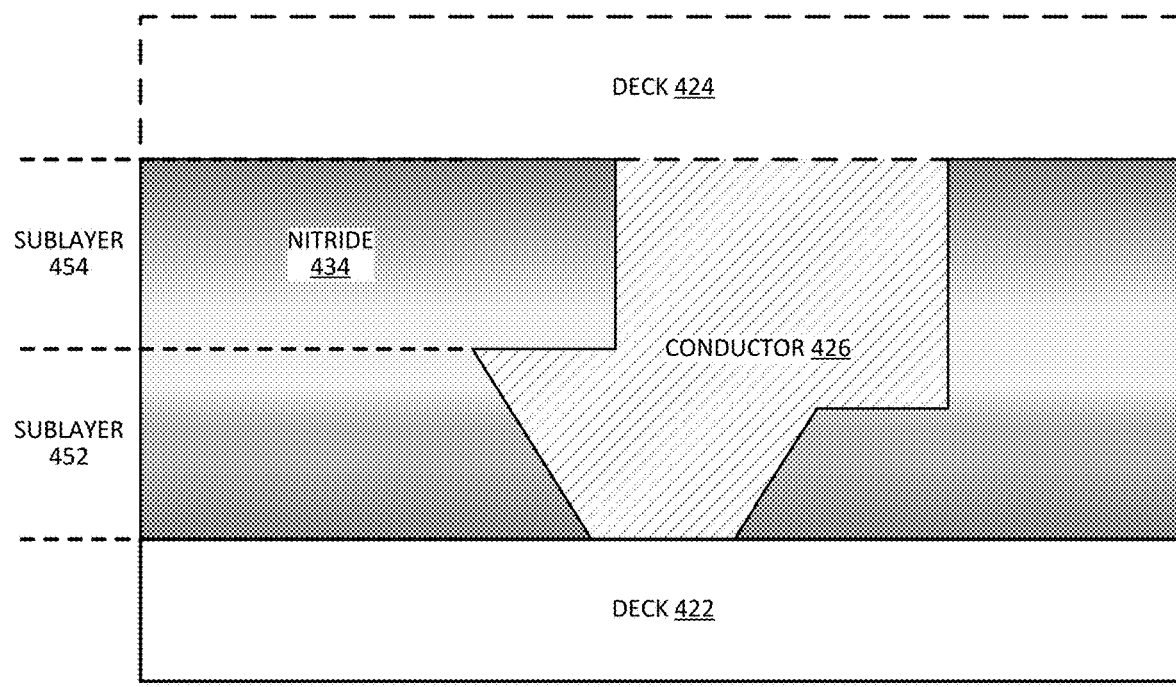

FIG. 4D illustrates view 408, which represents a cross section of the circuit of view 408 after depositing conductor 426 and creating deck 424. In one example, nitride 434 has two sublayers, referring to layers of nitride deposited with separate processing operations. Sublayer 452 represents a first sublayer deposited on deck 422. Sublayer 454 represents a second sublayer deposited on the first sublayer.

Conductor 426 represents a conductor such as metal or heavily doped polysilicon to provide an electrical connection between deck 422 and deck 424. Deck 424 represents a second deck to be created above deck 422. Nitride 434 represents an interdeck layer to separate deck 424 from deck 422. Conductor 426 represents a pillar connection to interconnect the two decks. Nitride 434 is between the two decks. Conductor 426 represents an offset pillar having a portion with a sloped edge/sidewall and a portion with a vertical edge or substantially vertical edge/sidewall.

The details of deck 422 and deck 424 are not specifically illustrated. The decks have integrated circuits, such as memory/storage devices, in a 3D stack. In one example, the bottom and top of each deck has an oxide layer. Thus, deck 424 can include an oxide layer at an interface of sublayer 454 with deck 424, and deck 422 can include an oxide layer at an interface of sublayer 452 with deck 422.

Figure 5:
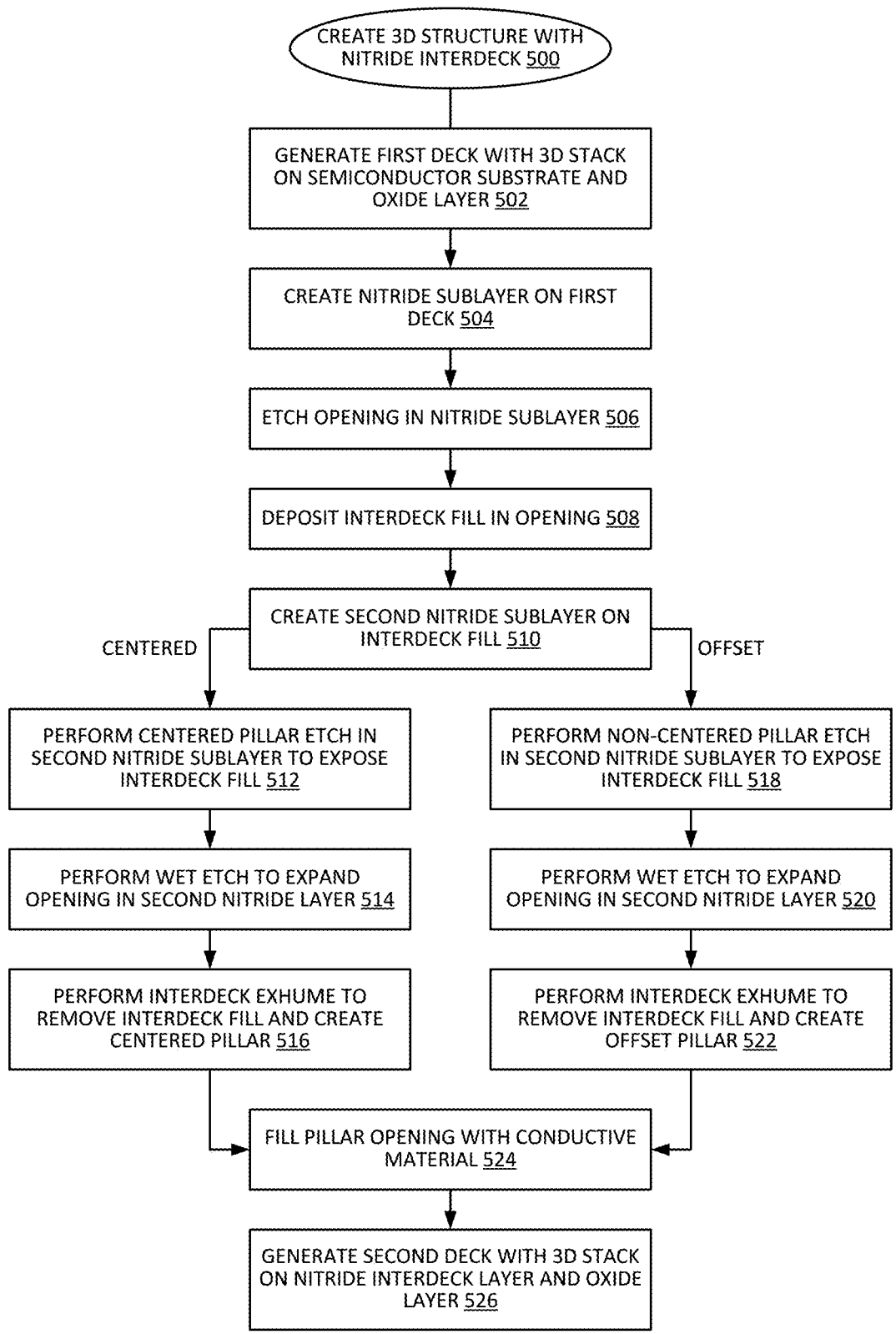
FIG. 5 is a flow diagram of an example of a process for creating a 3D structure with a nitride interdeck.

FIG. 5 is a flow diagram of an example of a process for creating a 3D structure with a nitride interdeck. Process 500 represents a process for creating a circuit structure in accordance with an example of view 308 or an example of view 408.

The processing operations generate a first deck with a 3D stack on a semiconductor substrate with an oxide layer on the top of the 3D stack, at 502. In one example, the first deck is created directly on the semiconductor substrate. In one example, the first deck is a deck that is on one or more other decks that are directly on the semiconductor substrate.

The processing creates a nitride sublayer on the first deck, at 504. The processing can then etch an opening in the nitride sublayer with a pillar etch, at 506. In one example, the opening has a funnel shape, which increases the CD of the pillar. The processing can deposit an interdeck fill in the opening, at 508. The processing can create a second nitride sublayer on the interdeck fill, at 510. In one example, the first nitride sublayer is doped. In one example, both the first and second nitride sublayers are doped.

In one example, the processing performs a centered pillar etch in the second nitride sublayer to expose the interdeck fill, at 512, along the CENTERED branch. The processing can then perform a wet etch to expand the opening in the second nitride layer, at 514. The processing can then perform an interdeck exhume to remove the interdeck fill material and create a centered pillar, at 516.

In one example, the processing performs a non-centered pillar etch in the second nitride sublayer to expose the interdeck fill, at 518, along the OFFSET branch. The processing can then perform a wet etch to expand the opening in the second nitride layer, at 520. The processing can then perform an interdeck exhume to remove the interdeck fill material and create an offset pillar, at 522.

The processing can fill the pillar opening with a conductive material to create a pillar of conductor between the first deck and a subsequent deck, at 524. The processing can generate a second deck with a 3D stack of devices on the nitride interdeck layer and oxide layer, at 526. In one example, the second deck has an oxide layer at an interface between the second deck and the nitride layer.

Figure 6A:
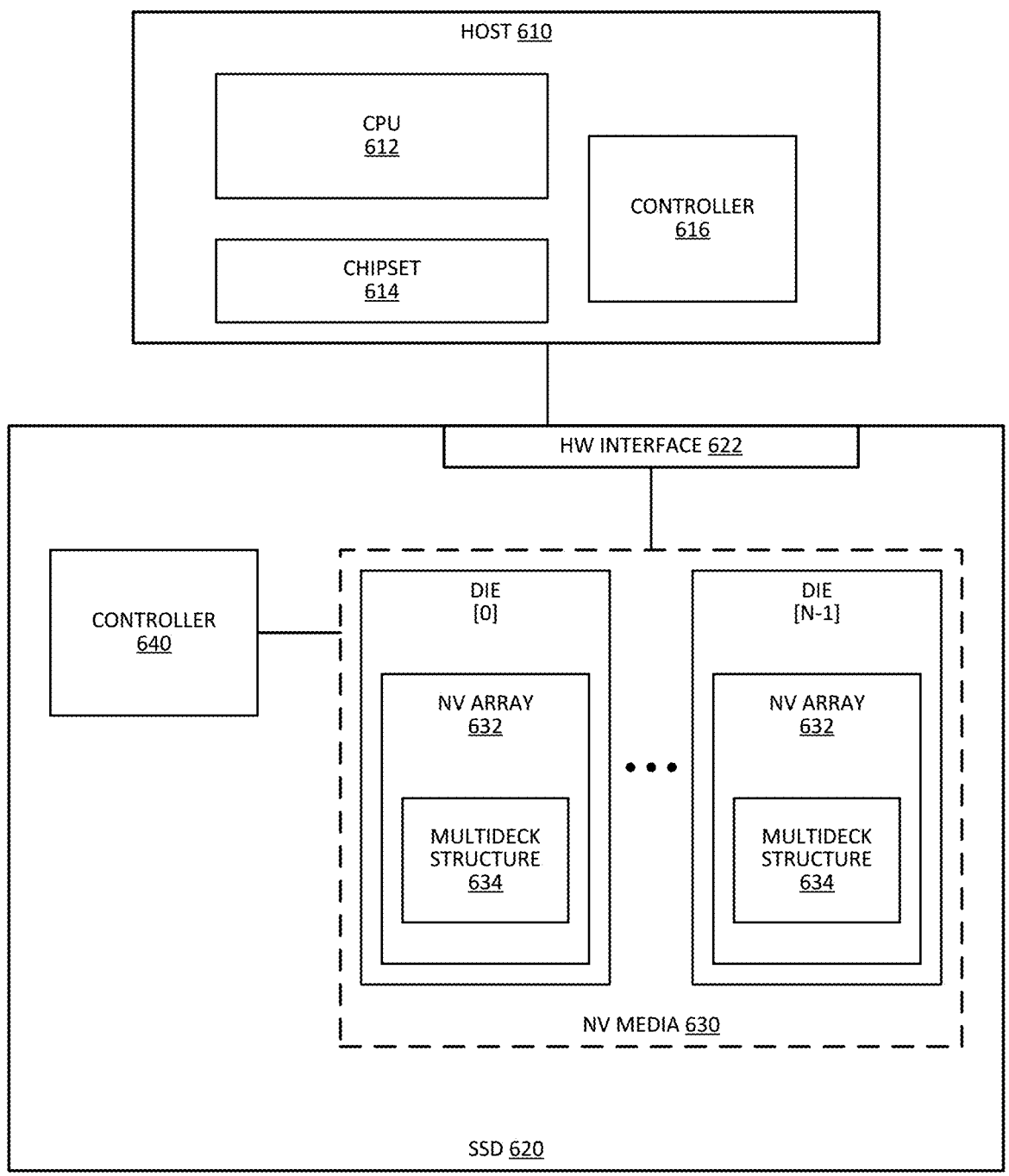
FIG. 6A is a block diagram of an example of a system with a solid state drive (SSD) with a multideck structure having a nitride interdeck.

FIG. 6A is a block diagram of an example of a system with a solid state drive (SSD) with a multideck structure having a nitride interdeck. System 602 represents components of a 3D NAND storage system that has an interdeck nitride layer in accordance with an example of the circuit of view 308 or an example of the circuit of view 408.

System 602 includes SSD 620 coupled with host 610. Host 610 represents a host hardware platform that connects to SSD 620. Host 610 includes CPU (central processing unit) 612 or other processor as a host processor or host processor device. CPU 612 represents any host processor that generates requests to access data stored on SSD 620, either to read the data or to write data to the storage. Such a processor can include a single or multicore processor, a primary processor for a computing device, a graphics processor, a peripheral processor, or a supplemental or auxiliary processor, or a combination. CPU 612 can execute a host OS and other applications to cause the operation of system 602.

Host 610 includes chipset 614, which represents hardware components that can be included in connecting between CPU 612 and SSD 620. For example, chipset 614 can include interconnect circuits and logic to enable access to SSD 620. Thus, host 610 can include a hardware platform drive interconnect to couple SSD 620 to host 610. Host 610 includes hardware to interconnect to the SSD. Likewise, SSD 620 includes corresponding hardware to interconnect to host 610.

Host 610 includes controller 616, which represents a storage controller or memory controller on the host side to control access to SSD 620. In one example, controller 616 is included in chipset 614. In one example, controller 616 is included in CPU 612. Controller 616 can be referred to as an NV memory controller to enable host 610 to schedule and organize commands to SSD 620 to read and write data.

SSD 620 represents a solid-state drive or other storage system or module that includes nonvolatile (NV) media 630 to store data. NV media 630 can be, for example, a 3D NAND array. SSD 620 includes HW (hardware) interface 622, which represents hardware components to interface with host 610. For example, HW interface 622 can interface with one or more buses to implement a high speed interface standard such as NVMe (nonvolatile memory express) or PCIe (peripheral component interconnect express).

In one example, NV media 630 is implemented as multiple dies, illustrated as N dies, Die[0:(N−1)]. N can be any number of devices, and is often a binary number. SSD 620 includes controller 640 to control access to NV media 630. Controller 640 represents hardware and control logic within SSD 620 to execute control over the media. Controller 640 is internal to the nonvolatile storage device or module, and is separate from controller 616 of host 610.

The NV dies of NV media 630 include 3D NV array 632, which is a three-dimensional array of storage cells based on the NV media. In one example, NV array 632 includes multideck structure 634, which includes an interdeck nitride layer in accordance with any example herein. NV array 632 provides an example of a storage array. In one example, NV array 632 represents an array of NAND cells/NAND devices.

Figure 6B:
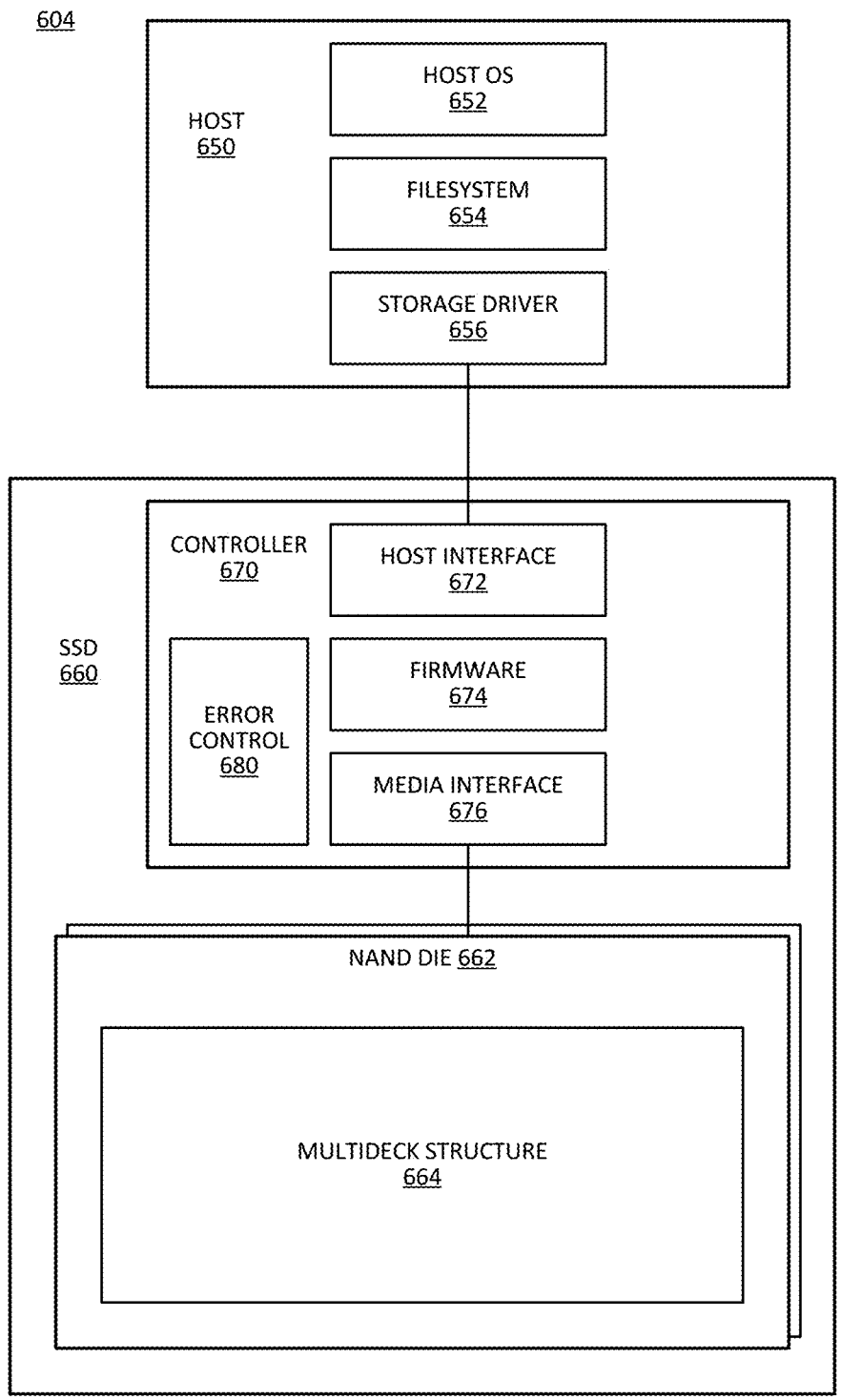
FIG. 6B is a block diagram of an example of a system with an SSD with a multideck structure having a nitride interdeck.

FIG. 6B is a block diagram of an example of a system with an SSD with a multideck structure having a nitride interdeck. System 604 provides one example of a system in accordance with system 602 of FIG. 6A. System 604 illustrates the logical layers of the host and SSD of a hardware platform in accordance with system 602. System 604 can represent software and firmware components of an example of system 602, as well as physical components. In one example, host 650 provides one example of host 610. SSD 660 provides one example of SSD 620.

In one example, host 650 includes host OS 652, which represents a host operating system or software platform for the host. Host OS 652 can include a platform on which applications, services, agents, and/or other software executes, and is executed by a processor. Filesystem 654 represents control logic for controlling access to the NV media. Filesystem 654 can manage what addresses or memory locations are used to store what data. Filesystem 654 can implement known filesystems or other proprietary systems. In one example, filesystem 654 is part of host OS 652.

Storage driver 656 represents one or more system-level modules that control the hardware of host 650. In one example, drivers 656 include a software application to control the interface to SSD 660, and thus control the hardware of SSD 660. Storage driver 656 can provide a communication interface between the host and the SSD.

Controller 670 of SSD 660 includes firmware 674, which represents control software/firmware for the controller. In one example, controller 670 includes host interface 672, which represents an interface to host 650. In one example, controller 670 includes media interface 676, which represents an interface to NAND die 662. NAND die 662 represents a specific example of NV media, and includes an associated 3D NAND array.

Firmware 674 represents control that is executed on hardware of controller 670. It will be understood that controller 670 includes hardware to interface with host 650, which can be considered to be controlled by host interface software/firmware 674. Likewise, it will be understood that controller 670 includes hardware to interface with NAND die 662. In one example, code for host interface 672 can be part of firmware 674. In one example, code for media interface 676 can be part of firmware 674.

In one example, controller 670 includes error control 680 to handle data errors in accessed data, and corner cases in terms of compliance with signaling and communication interfacing. Error control 680 can include implementations in hardware or firmware, or a combination of hardware and software.

In one example, NAND die 662 includes multideck structure 664, which enables the NAND die to include higher storage density, or higher capacity, or both. Multideck structure 664 includes a nitride interdeck structure in accordance with any example herein.

Figure 7:
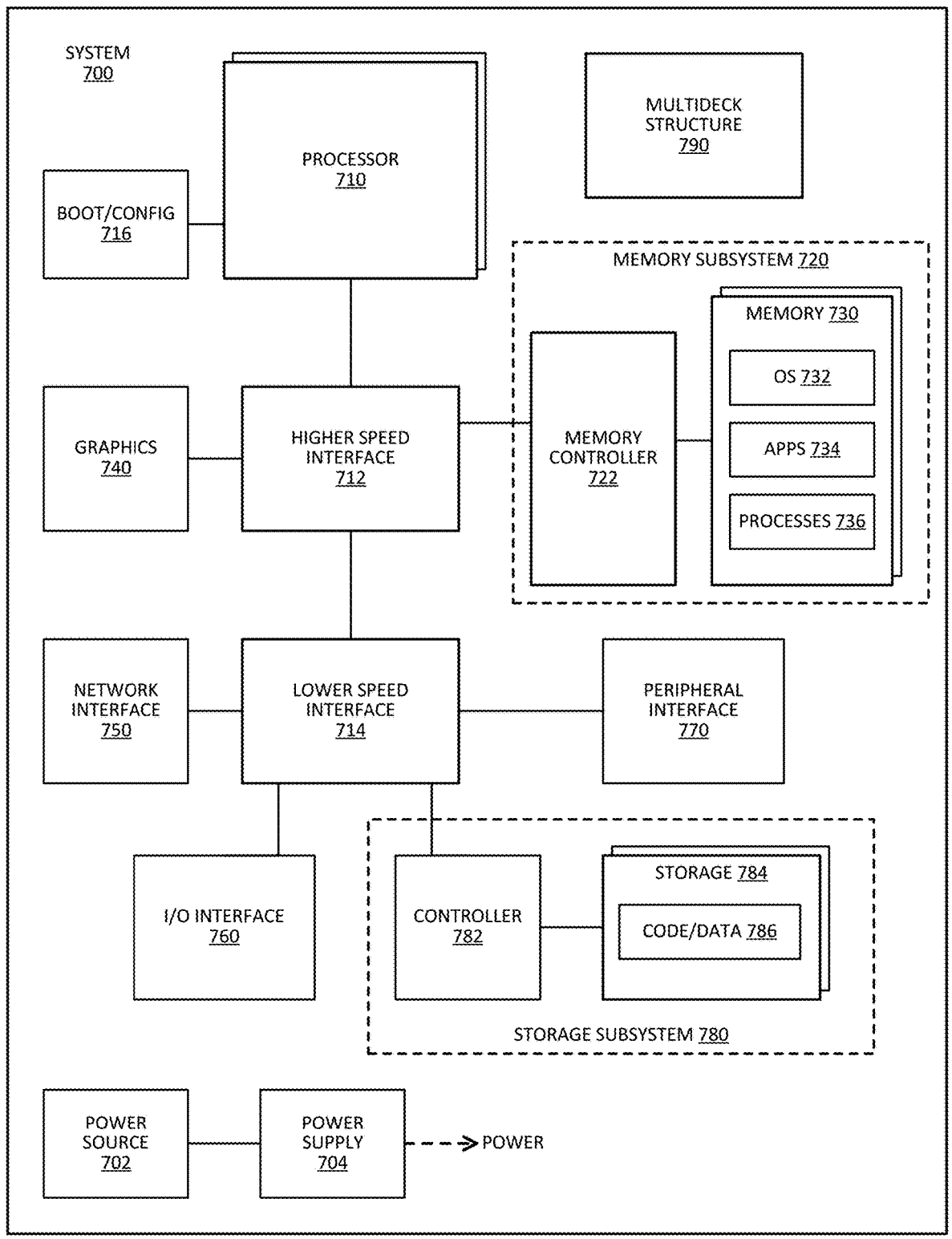
FIG. 7 is a block diagram of an example of a computing system in which a multideck structure with a nitride interdeck can be implemented.

FIG. 7 is a block diagram of an example of a computing system in which a multideck structure with a nitride interdeck can be implemented. System 700 represents a computing device in accordance with any example herein, and can be a laptop computer, a desktop computer, a tablet computer, a server, a gaming or entertainment control system, embedded computing device, or other electronic device.

System 700 represents a computer system that includes multideck structure 790, which includes a nitride interdeck structure in accordance with any example described. Multideck structure 790 can be part of storage subsystem 780, memory subsystem 720, or other components of system 700.

System 700 includes processor 710 can include any type of microprocessor, central processing unit (CPU), graphics processing unit (GPU), processing core, or other processing hardware, or a combination, to provide processing or execution of instructions for system 700. Processor 710 can be a host processor device. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or a combination of such devices.

System 700 includes boot/config 716, which represents storage to store boot code (e.g., basic input/output system (BIOS)), configuration settings, security hardware (e.g., trusted platform module (TPM)), or other system level hardware that operates outside of a host OS. Boot/config 716 can include a nonvolatile storage device, such as read-only memory (ROM), flash memory, or other memory devices.

In one example, system 700 includes interface 712 coupled to processor 710, which can represent a higher speed interface or a high throughput interface for system components that need higher bandwidth connections, such as memory subsystem 720 or graphics interface components 740. Interface 712 represents an interface circuit, which can be a standalone component or integrated onto a processor die. Interface 712 can be integrated as a circuit onto the processor die or integrated as a component on a system on a chip. Where present, graphics interface 740 interfaces to graphics components for providing a visual display to a user of system 700. Graphics interface 740 can be a standalone component or integrated onto the processor die or system on a chip. In one example, graphics interface 740 can drive a high definition (HD) display or ultra high definition (UHD) display that provides an output to a user. In one example, the display can include a touchscreen display. In one example, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more varieties of random-access memory (RAM) such as DRAM, 3DXP (three-dimensional crosspoint), or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710, such as integrated onto the processor die or a system on a chip.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, NAND, 3DXP, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

Figure 8:
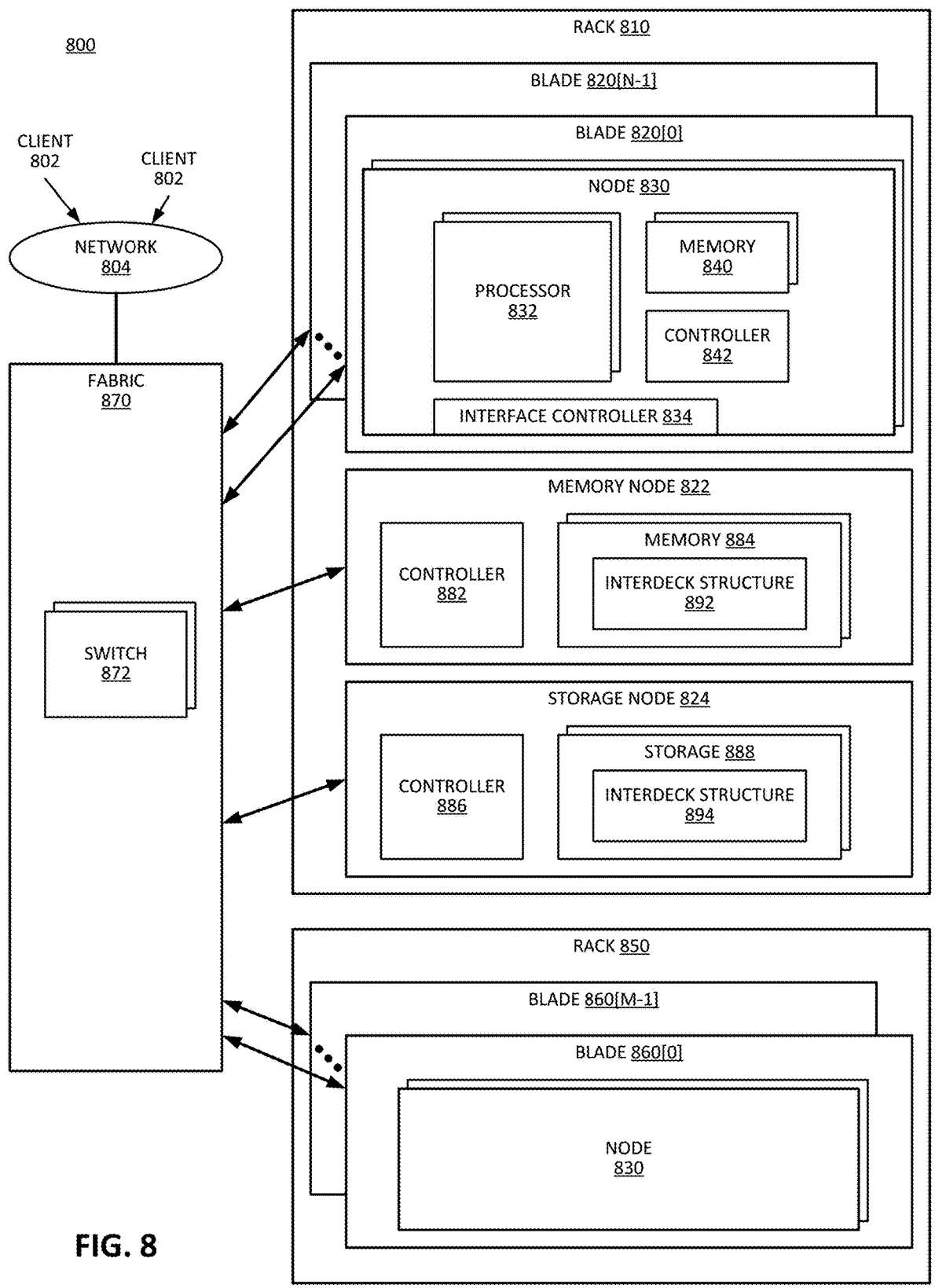
FIG. 8 is a block diagram of an example of a multi-node network in which a multideck structure with a nitride interdeck can be implemented.

FIG. 8 is a block diagram of an example of a multi-node network in which a multideck structure with a nitride interdeck can be implemented. System 800 represents a network of nodes. In one example, system 800 represents a data center. In one example, system 800 represents a server farm. In one example, system 800 represents a data cloud or a processing cloud.

System 800 includes nodes 830, which can include either memory node 822 or storage node 824, or both. In one example, memory node 822 includes memory 884 with interdeck structure 892, which includes a nitride interdeck structure in accordance with any example described. In one example, memory node 824 includes storage 888 with interdeck structure 894, which includes a nitride interdeck structure in accordance with any example described.

One or more clients 802 make requests over network 804 to system 800. Network 804 represents one or more local networks, or wide area networks, or a combination. Clients 802 can be human or machine clients, which generate requests for the execution of operations by system 800. System 800 executes applications or data computation tasks requested by clients 802.

In one example, system 800 includes one or more racks, which represent structural and interconnect resources to house and interconnect multiple computation nodes. In one example, rack 810 includes multiple nodes 830. In one example, rack 810 hosts multiple blade components, blade 820[0], . . . , blade 820[N−1], collectively blades 820. Hosting refers to providing power, structural or mechanical support, and interconnection. Blades 820 can refer to computing resources on printed circuit boards (PCBs), where a PCB houses the hardware components for one or more nodes 830. In one example, blades 820 do not include a chassis or housing or other "box" other than that provided by rack 810. In one example, blades 820 include housing with exposed connector to connect into rack 810. In one example, system 800 does not include rack 810, and each blade 820 includes a chassis or housing that can stack or otherwise reside in close proximity to other blades and allow interconnection of nodes 830.

System 800 includes fabric 870, which represents one or more interconnectors for nodes 830. In one example, fabric 870 includes multiple switches 872 or routers or other hardware to route signals among nodes 830. Additionally, fabric 870 can couple system 800 to network 804 for access by clients 802. In addition to routing equipment, fabric 870 can be considered to include the cables or ports or other hardware equipment to couple nodes 830 together. In one example, fabric 870 has one or more associated protocols to manage the routing of signals through system 800. In one example, the protocol or protocols is at least partly dependent on the hardware equipment used in system 800.

As illustrated, rack 810 includes N blades 820. In one example, in addition to rack 810, system 800 includes rack 850. As illustrated, rack 850 includes M blade components, blade 860[0], . . . , blade 860[M−1], collectively blades 860. M is not necessarily the same as N; thus, it will be understood that various different hardware equipment components could be used, and coupled together into system 800 over fabric 870. Blades 860 can be the same or similar to blades 820. Nodes 830 can be any type of node and are not necessarily all the same type of node. System 800 is not limited to being homogenous, nor is it limited to not being homogenous.

The nodes in system 800 can include compute nodes, memory nodes, storage nodes, accelerator nodes, or other nodes. Rack 810 is represented with memory node 822 and storage node 824, which represent shared system memory resources, and shared persistent storage, respectively. One or more nodes of rack 850 can be a memory node or a storage node.

Nodes 830 represent examples of compute nodes. For simplicity, only the compute node in blade 820[0] is illustrated in detail. However, other nodes in system 800 can be the same or similar. At least some nodes 830 are computation nodes, with processor (proc) 832 and memory 840. A computation node refers to a node with processing resources (e.g., one or more processors) that executes an operating system and can receive and process one or more tasks. In one example, at least some nodes 830 are server nodes with a server as processing resources represented by processor 832 and memory 840.

Memory node 822 represents an example of a memory node, with system memory external to the compute nodes. Memory nodes can include controller 882, which represents a processor on the node to manage access to the memory. The memory nodes include memory 884 as memory resources to be shared among multiple compute nodes.

Storage node 824 represents an example of a storage server, which refers to a node with more storage resources than a computation node, and rather than having processors for the execution of tasks, a storage server includes processing resources to manage access to the storage nodes within the storage server. Storage nodes can include controller 886 to manage access to the storage 888 of the storage node.

In one example, node 830 includes interface controller 834, which represents logic to control access by node 830 to fabric 870. The logic can include hardware resources to interconnect to the physical interconnection hardware. The logic can include software or firmware logic to manage the interconnection. In one example, interface controller 834 is or includes a host fabric interface, which can be a fabric interface in accordance with any example described herein. The interface controllers for memory node 822 and storage node 824 are not explicitly shown.

Processor 832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 840 can be or include memory devices represented by memory 840 and a memory controller represented by controller 842.

In general with respect to the descriptions herein, in one aspect, a semiconductor circuit includes: a first deck including a first three-dimensional (3D) stack of semiconductor devices; a second deck including a second 3D stack of semiconductor devices; and a nitride layer between the first deck and the second deck, the nitride layer having a self-aligned pillar through the nitride layer to electrically connect the first deck to the second deck.

In one example of the semiconductor circuit, the semiconductor devices comprise memory devices. In accordance with any preceding example of the semiconductor circuit, in one example, the nitride layer has a first sublayer and a second sublayer, the first sublayer having a gradient doping, with higher doping at an interface of the first sublayer with the first deck and lower doping at an interface of the first sublayer with the second sublayer. In accordance with any preceding example of the semiconductor circuit, in one example, the second sublayer has a gradient doping, with higher doping at an interface of the second sublayer with the second deck and lower doping at an interface of the second sublayer with the first sublayer. In accordance with any preceding example of the semiconductor circuit, in one example, the doping comprises carbon doping. In accordance with any preceding example of the semiconductor circuit, in one example, the first deck includes an oxide layer at the interface of the first sublayer with the first deck, and wherein the second deck includes an oxide layer at the interface of the second sublayer with the second deck. In accordance with any preceding example of the semiconductor circuit, in one example, the self-aligned pillar comprises a portion with a sloped sidewall. In accordance with any preceding example of the semiconductor circuit, in one example, the self-aligned pillar comprises a portion with substantially vertical sidewall.

In general with respect to the descriptions herein, in one aspect, a storage device includes: a controller; and a storage array including: a first deck including a first three-dimensional (3D) stack of storage circuits; a second deck including a second 3D stack of storage circuits; and a nitride layer between the first deck and the second deck, the nitride layer having a self-aligned pillar through the nitride layer to electrically connect the first deck to the second deck.

In accordance with an example of the storage device, the storage circuits comprise 3D NAND cells. In accordance with any preceding example of the storage device, in one example, the nitride layer has a first sublayer and a second sublayer, the first sublayer having a gradient doping, with higher doping at an interface of the first sublayer with the first deck and lower doping at an interface of the first sublayer with the second sublayer, the second sublayer having a gradient doping, with higher doping at an interface of the second sublayer with the second deck and lower doping at an interface of the second sublayer with the first sublayer. In accordance with any preceding example of the storage device, in one example, the first deck includes an oxide layer at the interface of the first sublayer with the first deck, and wherein the second deck includes an oxide layer at the interface of the second sublayer with the second deck. In accordance with any preceding example of the storage device, in one example, the self-aligned pillar comprises a portion with a sloped sidewall. In accordance with any preceding example of the storage device, in one example, the self-aligned pillar comprises a portion with substantially vertical sidewall. In accordance with any preceding example of the storage device, in one example, the doping comprises carbon doping. In accordance with any preceding example of the storage device, in one example, the first deck includes an oxide layer at the interface of the first sublayer with the first deck, and wherein the second deck includes an oxide layer at the interface of the second sublayer with the second deck.

In general with respect to the descriptions herein, in one aspect, a computer system includes: a host processor; and a device storage including: a first deck including a first three-dimensional (3D) stack of storage circuits; a second deck including a second 3D stack of storage circuits; and a nitride layer between the first deck and the second deck, the nitride layer having a self-aligned pillar through the nitride layer to electrically connect the first deck to the second deck.

In accordance with an example of the computer system, the storage circuits comprise 3D NAND cells. In accordance with any preceding example of the computer system, in one example, the nitride layer has a first sublayer and a second sublayer, the first sublayer having a gradient doping, with higher doping at an interface of the first sublayer with the first deck and lower doping at an interface of the first sublayer with the second sublayer, the second sublayer having a gradient doping, with higher doping at an interface of the second sublayer with the second deck and lower doping at an interface of the second sublayer with the first sublayer. In accordance with any preceding example of the computer system, in one example, the first deck includes an oxide layer at the interface of the first sublayer with the first deck, and wherein the second deck includes an oxide layer at the interface of the second sublayer with the second deck. In accordance with any preceding example of the computer system, in one example, the self-aligned pillar comprises a portion with a sloped sidewall. In accordance with any preceding example of the computer system, in one example, the self-aligned pillar comprises a portion with substantially vertical sidewall. In accordance with any preceding example of the computer system, in one example, the doping comprises carbon doping. In accordance with any preceding example of the computer system, in one example, the first deck includes an oxide layer at the interface of the first sublayer with the first deck, and wherein the second deck includes an oxide layer at the interface of the second sublayer with the second deck. In accordance with any preceding example of the computer system, in one example, the host processor comprises a multicore processor. In accordance with any preceding example of the computer system, in one example, the computer system includes a display communicatively coupled to the host processor. In accordance with any preceding example of the computer system, in one example, the computer system includes a network interface communicatively coupled to the host processor. In accordance with any preceding example of the computer system, in one example, the computer system includes a battery to power the computer system.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A semiconductor circuit comprising:
    a first deck including a first three-dimensional (3D) stack of semiconductor devices;
    a second deck including a second 3D stack of semiconductor devices; and
    a nitride layer between the first deck and the second deck, the nitride layer having a self-aligned pillar through the nitride layer to electrically connect the first deck to the second deck, wherein the nitride layer has a first sublayer and a second sublayer, the first sublayer having a gradient doping, with higher doping at an interface of the first sublayer with the first deck and lower doping at an interface of the first sublayer with the second sublayer.

2. The semiconductor circuit of claim 1, wherein the semiconductor devices comprise memory devices.

3. The semiconductor circuit of claim 1, wherein the second sublayer has a gradient doping, with higher doping at an interface of the second sublayer with the second deck and lower doping at an interface of the second sublayer with the first sublayer.

4. The semiconductor circuit of claim 1, wherein the doping comprises carbon doping.

5. The semiconductor circuit of claim 1, wherein the first deck includes an oxide layer at the interface of the first sublayer with the first deck, and wherein the second deck includes an oxide layer at the interface of the second sublayer with the second deck.

6. The semiconductor circuit of claim 1, wherein the self-aligned pillar comprises a portion with a sloped sidewall.

7. The semiconductor circuit of claim 1, wherein the self-aligned pillar comprises a portion with substantially vertical sidewall.

8. A storage device, comprising:
a controller; and
a storage array including:
- a first deck including a first three-dimensional (3D) stack of storage circuits;
- a second deck including a second 3D stack of storage circuits; and
- a nitride layer between the first deck and the second deck, the nitride layer having a self-aligned pillar through the nitride layer to electrically connect the first deck to the second deck, wherein the nitride layer has a first sublayer and a second sublayer, the first sublayer having a gradient doping, with higher doping at an interface of the first sublayer with the first deck and lower doping at an interface of the first sublayer with the second sublayer.

9. The storage device of claim 8, wherein the storage circuits comprise 3D NAND cells.

10. The storage device of claim 8, the second sublayer has a gradient doping, with higher doping at an interface of the second sublayer with the second deck and lower doping at an interface of the second sublayer with the first sublayer.

11. The storage device of claim 10, wherein the first deck includes an oxide layer at the interface of the first sublayer with the first deck, and wherein the second deck includes an oxide layer at the interface of the second sublayer with the second deck.

12. The storage device of claim 10, wherein the self-aligned pillar comprises a portion with a sloped sidewall.

13. The storage device of claim 10, wherein the self-aligned pillar comprises a portion with substantially vertical sidewall.

14. A computer system, comprising:
a host processor; and
a device storage including:
- a first deck including a first three-dimensional (3D) stack of storage circuits;
- a second deck including a second 3D stack of storage circuits; and
- a nitride layer between the first deck and the second deck, the nitride layer having a self-aligned pillar through the nitride layer to electrically connect the first deck to the second deck, wherein the nitride layer has a first sublayer and a second sublayer, the first sublayer having a gradient doping, with higher doping at an interface of the first sublayer with the first deck and lower doping at an interface of the first sublayer with the second sublayer.

15. The computer system of claim 14, wherein the storage circuits comprise 3D NAND devices.

16. The computer system of claim 14, wherein the gradient doping has higher carbon doping at the interface of the first sublayer with the first deck and lower carbon doping at the interface of the first sublayer with the second sublayer, the second sublayer having a gradient doping, with higher carbon doping at an interface of the second sublayer with the second deck and lower carbon doping at an interface of the second sublayer with the first sublayer.

17. The computer system of claim 16, wherein the self-aligned pillar comprises a portion with a sloped sidewall.

18. The computer system of claim 16, wherein the self-aligned pillar comprises a portion with substantially vertical sidewall.

19. The computer system of claim 14, wherein:
the host processor comprises a multicore processor;
a display communicatively coupled to the host processor;
a network interface communicatively coupled to the host processor; or
a battery to power the computer system.

* * * * *